No. 763,523. PATENTED JUNE 28, 1904.
J. A. & F. L. TRAUT.
MEASURING RULE.
APPLICATION FILED FEB. 29, 1904.
NO MODEL.
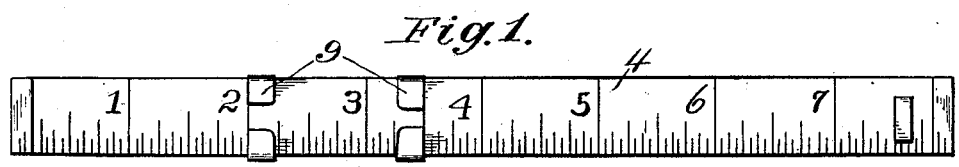
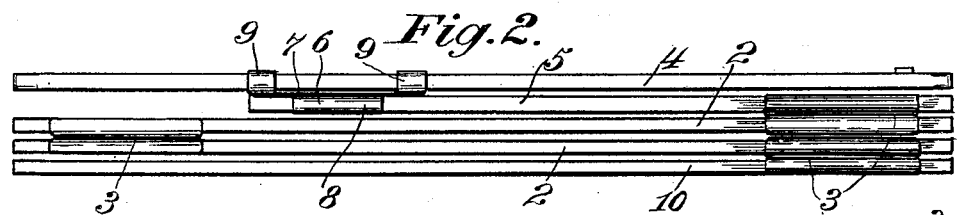
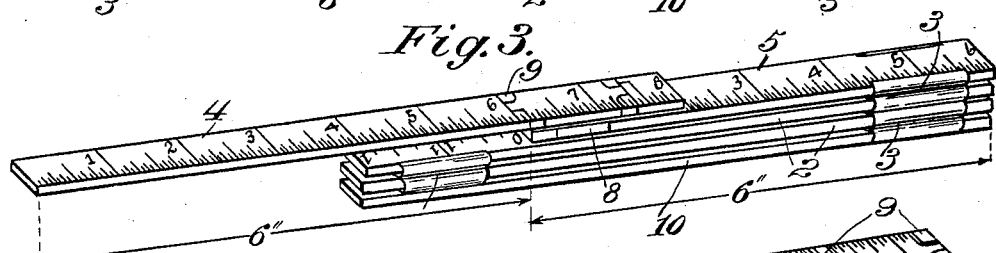
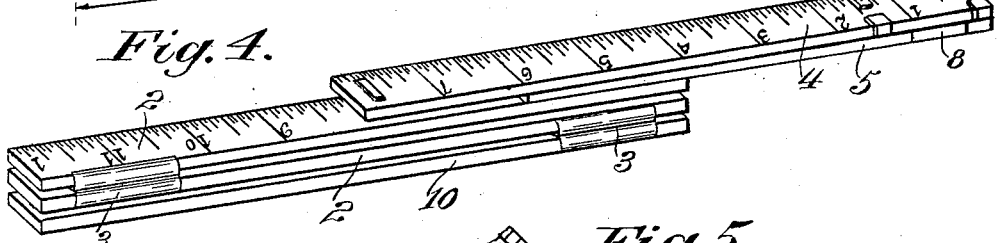
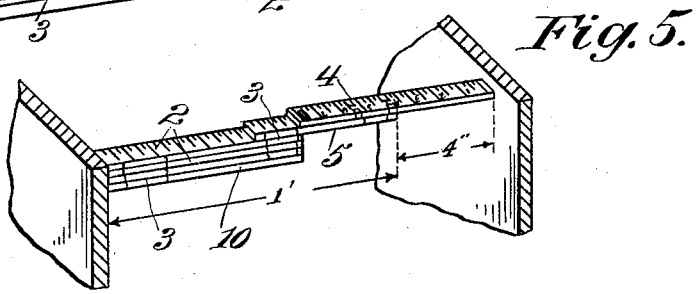
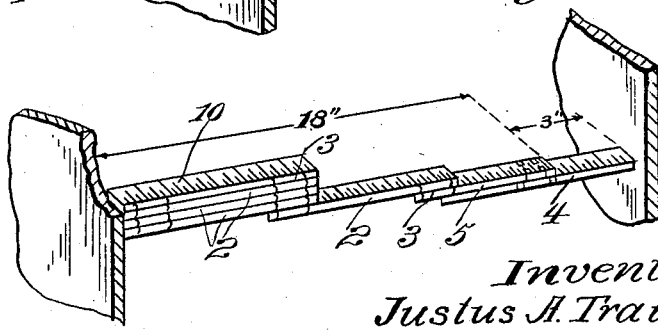
Witnesses:
R. W. Pittman
Robert Adt
Inventors,
Justus A. Traut.
Frank L. Traut.
By their Attorney
F. H. Richards, No. 763,523. Patented June 28, 1904.

UNITED STATES PATENT OFFICE.

JUSTUS A. TRAUT AND FRANK L. TRAUT, OF NEW BRITAIN, CONNECTICUT.

MEASURING-RULE.

SPECIFICATION forming part of Letters Patent No. 763,523, dated June 28, 1904.

Application filed February 29, 1904. Serial No. 195,717. (No model.)

*To all whom it may concern:*

Be it known that we, JUSTUS A. TRAUT and FRANK L. TRAUT, residing at New Britain, in the county of Hartford and State of Connecticut, citizens of the United States, have invented certain new and useful Improvements in Measuring-Rules, of which the following is a specification.

This invention is designed more especially for facilitating the operation of measuring with a rule, particularly of the caliper type.

Such rules generally embody a jointed construction and comprise articulated sections, each capable of being swung outward with reference to the section to which it is jointed in unfolding or extending the rule, a reverse movement serving to fold up the rule into small compass. Included as a feature of the rule is a supplemental or caliper section capable generally of sliding lengthwise of that terminal section on which it is mounted and shiftable outward beyond the extremity of such terminal section in order to make up the over-all dimension between the two points whose distance apart is to be ascertained.

The present invention is closely related to that disclosed in our Patent No. 716,150, entitled "Measuring-rule," and granted to us on December 16, 1902. The manner in which the rule of that patent is ordinarily used in the operation of measuring is, however, distinctly different from the manner in which the measurement is ascertained from the rule of the present invention. In the use of the former rule, with none of the sections unfolded and assuming that the supplemental or caliper section B of the patent is drawn out so that the end of the caliper-section is in the plane passing through one of the two points whose distance apart is to be measured, the opposite end of the rule being in the plane of the other point, the distance apart of the two planes is ascertained by taking the terminal reading at the end of the bundle of folded sections, suitably graduated, and adding thereto the distance in units of measurement (and fractions thereof, it may be) that the caliper-section extends beyond the end of the section on which it is slidably mounted. In the event that the rule is more or less lengthened out by the unfolding of more or less of its sections the required measurement is ascertained in substantially the same manner. In order to facilitate (assuming the caliper-section to lie uppermost) the obtainment of this measurement with any degree of rapidity, it is necessary, moreover, that the sections of the rule be unfolded consecutively, beginning with that terminal section on which the caliper-section is mounted, since the graduation is usually made in a consecutive manner from one end of the rule to the other. If, on the other hand, the rule is held so that the caliper-section lies underneath, it is also generally true that in order to obtain most expeditiously the result sought the sections beginning with the uppermost-lying terminal section shall be unfolded consecutively, as otherwise in both positions of holding the rule there will be a break in the continuity of the markings, necessitating a mental regraduation to ascertain the true measurement. Generally, therefore, with the rule of the patent the result sought involves either the reading of the graduations alone or such a reading in connection with a mental computation. With the present rule construction, however, such readings are not necessarily made in ascertaining the measurement, since the sections of the rule are of such relative lengths and so graduated as to require the user to merely mentally note the number of sections unfolded, this number being then multiplied by a constant factor, (the distance between the joints at the two ends of each main or body section,) and the product, added to the distance the caliper-section projects beyond the free end of the terminal section on which it is mounted, is the dimension required.

In the drawings accompanying the present specification, Figures 1 and 2 are top and side elevations, respectively, of a caliper-rule embodying our present invention. Fig. 3 is a perspective view of the bundle of folded rule-sections with the caliper-section extended and indicates the manner in which the over-all distance between the projecting end of the caliper-section and the opposite end of the rule is ascertained. Fig. 4 is a similar view to Fig. 3 and indicates the terminal section on which the caliper-section is mounted as having been swung about its pivotal connection with the rule in line with the sections of the latter. Figs. 5 and 6 illustrate the manner of using the rule in ascertaining the distance between points under conditions when the use of the caliper-section is necessary.

Similar characters of reference designate corresponding parts in all figures.

The present invention is disclosed in a folding rule of that construction in which a number of main or body sections or leaves are pivotally jointed adjacent to their opposite ends, at one end to a section on one side and at the opposite end to a section on the opposite side of the intermediate section, so that the superposed sections may be swung in planes parallel to their faces. The rule includes a desired number of such jointed sections, such as 2, interposed between terminal sections and connected at their opposite ends by joints, such as 3, substantially in the alternate disposition indicated, and since the construction of these joints constitutes no part of the present invention they will not be further described. Suffice it here to say that the construction of the joints is such as to permit the sections to be folded out to extend the rule or folded in to close up the latter.

The caliper-section 4 is mounted upon the terminal section 5 of the jointed bundle and engages with a fitting 6, by which the movement of the caliper-section is confined to a rectilinear one in line with the terminal section. The fitting 6 is of a construction such as to hold the caliper-section in association with the terminal section 5 of the rule and to confine it to a movement of the character aforesaid. The particular construction of the fitting illustrated comprises a plate 7, having laterally-extending keepers 8, by means of which the fitting is secured adjacent to the free end of the terminal section 5, and oppositely-extending keepers 9, bent over to form a guide confining the caliper-section to its right-line movement. We prefer that the outer edge of those keepers 9 which are nearest the free end of the terminal section shall be in line with the end of the latter section, so that the common plane of said end and said edges constitutes an index from which the amount that the caliper-section projects beyond the terminal section may be read.

In the statement hereinbefore made as to the manner in which the measured distance is taken from the rule it is mentioned that a reading of the marking on the rule-sections (excepting the caliper-section) is unnecessary, the measurement of the distance being obtained by counting the number of sections unfolded, multiplying the same by a constant factor, and adding to the result the amount which the caliper-section projects beyond the end of that terminal section on which it is mounted. In order that the measurement may be ascertained this way, the terminal section opposite to that on which the caliper-section is mounted has an over-all length equal to the over-all length of each of the main or body sections of the rule, while the length of the terminal section on which the caliper-section is mounted is less than such dimension by twice the distance from the end of any main section to the pivotal axis of the joint nearest that end, this distance being the same for each main section. The constant factor of the multiplication referred to is the distance between the pivotal axes at the two ends of the rule common to all the main or body sections, (all of a uniform length,) it being understood that the joints at one end of the folded rule lie directly over each other with their pivotal axes all in line and correspondingly with respect to the joints at the other end of the folded rule.

It is evident from the foregoing that the total length of the shorter terminal section is equal to the distance between the pivotal axes at the two ends of the folded rule. In measuring a distance, therefore, with the rule entirely folded and the caliper-section drawn out to thereby span the distance between the two points from one to the other of which the measurement is to be taken the result is given by adding to the common factor aforesaid the graduation-reading on the caliper-section at the index plane—that is, at the end of the shorter terminal section. When, however, the conditions are such that the shorter terminal section has been swung on its pivot so as to bring it in line with the section to which it is pivoted, (the rule then being partly extended,) that portion of the shorter terminal section which projects beyond its pivotal axis and lies on the opposite side of the part carrying the caliper-section comes over the bundle of sections beneath and the effective length of the shorter section is further reduced by that amount. Assuming then that only the shorter terminal section is extended, the distance so subtracted from the effective length thereof will be compensated for at the opposite end of the bundle by the part projecting beyond the pivotal axis thereat, so that the total measured length will be the distance between the pivotal axes of the folded rule (equivalent to the common factor used once) added to the shorter terminal section increased by the length from the pivotal axis to the adjacent end of any body-section, (again equivalent to the common factor used once,) to which sum must be added the projecting caliper-section length, or, in other words, assuming the rule to be folded out but once, the desired measurement will be equal to the common factor taken twice added to the amount which the caliper-section projects. If the distance to be measured is such as to require a further unfolding of the rule, it is apparent that the effective length of any section at whose opposite ends the contiguous sections extend in line with it is equivalent to the common factor, while the length of the shortened shorter terminal section is compensated for by that portion of the unfolded rule projecting beyond the pivotal axis at the further end of the rule or by the other full-length terminal section.

In order that the manner of using a rule embodying the present construction and graduated in inches may be more readily comprehended, let it be assumed that the markings thereon and lengths of rule-sections are substantially that indicated in the drawings, in which the distance between the pivotal axes at the two ends of the rule is equal to six inches, while each body or main section extends at each end an inch beyond the pivotal axis thereat. Each main section is therefore eight inches long, as is also the longer terminal section, while the shorter terminal section is six inches long, the caliper-section being conveniently also eight inches long. Suppose that a condition of the rule such as indicated in Fig. 3 will suffice to measure the distance required. The latter will then be equal to the common factor taken once, or six inches, plus six inches that the caliper-section projects, together equal to twelve inches. Again, assume that it is necessary to swing outward the shorter terminal section, as in Fig. 4, it not being necessary to withdraw the caliper-section. The required distance will then be the common factor, six inches, taken twice, or twelve inches. Again, suppose, as in Fig. 5, that the conditions are as in Fig. 4, except that the caliper-section must be withdrawn to some extent—say four inches. The required distance will then be, as before, the common factor taken twice, equal to twelve inches, added to the four inches which the caliper-section projects, or sixteen inches. In Fig. 6 a measurement is being taken which requires the rule to be unfolded twice, while the caliper-section is withdrawn to the extent of three inches. The measurement sought will then be equal to the common factor taken three times, or eighteen inches, to which must be added the three inches which the caliper-section projects, making twenty-one inches in all. In the ascertainment of the measurement, therefore, whatever it may be, it is apparent that no reading (with the exception of that of the withdrawn caliper-section) is necessary to be taken from the graduations on the rule, it sufficing for this purpose to note the number of unfolded sections, which number, counting the unfolded bundle as one, multiplied by the common factor and added to the amount the caliper projects, gives the length or measurement sought.

Having described our invention, we claim—

1. In a folding rule, a main or body section; a terminal section pivotally jointed thereto, the terminal section being less in length than the main section by an amount equal to twice the distance from the pivotal axis to the adjacent end of the main section; and a caliper-section mounted on the terminal section.

2. In a folding rule, the combination with one or more main sections, of a pair of terminal sections each having a pivotal connection with a main section and comprising one full-length section and one section shorter than the other section, and a caliper-section mounted on the shorter terminal section.

3. In a folding rule, a series of pivotally-jointed body or main sections; a terminal section at one side of the folded rule, pivotally connected with the contiguous main section and having a length equal to the length of the latter; a shorter terminal section at the opposite side of the folded rule and also having a pivotal connection with the contiguous main section; and a caliper-section mounted on the shorter terminal section and of the length of the main section.

4. In a rule, the combination of a series of main or body sections, each pivotally connected at one end to a contiguous section on one side and similarly connected at the opposite end to a section on the opposite side; terminal sections at the opposite sides of the folded rule similarly connected with contiguous main sections, and one of the terminal sections being shorter than the other by an amount equal to twice the distance from the pivotal axis adjacent to either end of a main section to the nearest end thereof; and a caliper-section mounted to slide back and forth on the shorter terminal section.

5. In a folding rule, the combination with a series of main or body sections, each pivotally jointed at one end to a contiguous section on one side and at the opposite end to a contiguous section on the opposite side, the pivotal axes of the joints at one end of the folded rule coinciding and those at the opposite end also coinciding; a terminal section at one side of the folded rule pivotally jointed to the contiguous main section and having a length equal to the latter; a terminal section at the opposite side of the folded rule pivotally jointed to the contiguous main section and extending from a point in line with that end of the latter adjacent to the joint of the terminal section therewith to a point distant from the opposite end of the folded rule an amount equal to twice the distance from the pivotal axis of a main section to the adjacent end of the latter; and a caliper-section mounted to slide lengthwise on the shorter terminal section thereof.

JUSTUS A. TRAUT.
FRANK L. TRAUT.

Witnesses:
W. J. WORAM,
E. G. HOFFMAN.